(12) United States Patent
Einfeldt et al.

(10) Patent No.: US 8,177,904 B2
(45) Date of Patent: May 15, 2012

(54) USE OF POLYMERIC MICROPARTICLES IN BUILDING MATERIAL MIXTURES

(75) Inventors: Lars Einfeldt, Jena (DE); Gerhard Albrecht, Tacherting (DE); Gerd Löhden, Hanau (DE); Holger Kautz, Hanau (DE)

(73) Assignees: Construction Research & Technology GmbH, Trostberg (DE); Evonik Rohm GmbH, Darmstadt (DE)

( * ) Notice: Subject to any disclaimer, the term of this patent is extended or adjusted under 35 U.S.C. 154(b) by 421 days.

(21) Appl. No.: 12/290,880

(22) Filed: Nov. 4, 2008

(65) Prior Publication Data

US 2009/0099271 A1 Apr. 16, 2009

Related U.S. Application Data

(63) Continuation of application No. 11/247,962, filed on Oct. 11, 2005, now abandoned.

(30) Foreign Application Priority Data

Sep. 29, 2005 (DE) .......................... 10 2005 046 681

(51) Int. Cl.
*C04B 16/08* (2006.01)
(52) U.S. Cl. ......... 106/696; 106/724; 106/727; 106/823
(58) Field of Classification Search .................. 106/696, 106/724, 727, 823
See application file for complete search history.

(56) References Cited

U.S. PATENT DOCUMENTS

| | | | | |
|---|---|---|---|---|
| 4,057,526 A | * | 11/1977 | de Rook | 521/55 |
| 4,082,562 A | * | 4/1978 | Litvan et al. | 106/681 |
| 4,111,713 A | * | 9/1978 | Beck | 106/409 |
| 4,268,411 A | * | 5/1981 | Iwata et al. | 428/402.2 |
| 7,531,584 B2 | * | 5/2009 | Kerns et al. | 524/2 |
| 7,543,642 B2 | * | 6/2009 | Reddy et al. | 166/292 |
| 2004/0034147 A1 | * | 2/2004 | Zama | 524/460 |
| 2007/0068088 A1 | * | 3/2007 | Einfeldt et al. | 52/3 |
| 2007/0193159 A1 | * | 8/2007 | Schattka et al. | 52/309.17 |
| 2007/0193478 A1 | * | 8/2007 | Schattka et al. | 106/802 |
| 2007/0197671 A1 | * | 8/2007 | Schattka et al. | 521/55 |

FOREIGN PATENT DOCUMENTS

| | | |
|---|---|---|
| DD | 19 506 331 A1 | 8/1996 |
| DE | 1 181 397 B | 11/1964 |
| DE | 2 229 094 A1 | 1/1973 |
| DE | 198 33 062 A1 | 2/2000 |
| DE | 199 12 652 A1 | 4/2000 |
| DE | 29 924 111 U1 | 1/2002 |
| EP | 0 073 529 A2 | 3/1963 |
| GB | 2 340 125 A | 2/2000 |
| JP | 06-023735 | 2/1994 |
| JP | 08-059327 | 3/1996 |
| JP | 08-188458 | 7/1996 |
| JP | 2004-238245 | 8/2004 |
| JP | 2005206399 | * 8/2005 |

OTHER PUBLICATIONS

JP 2005206399 A (Kobayashi et al.) Aug. 4, 2005. abstract only.*
P 2005206399 A (Kobayashi et al.) Aug. 4, 2005. Machine Translation into English.*

* cited by examiner

*Primary Examiner* — Paul Marcantoni
(74) *Attorney, Agent, or Firm* — Fulbright & Jaworski L.L.P.

(57) ABSTRACT

The use of polymeric microparticles having a cavity in hydraulically setting building material mixtures is described, from 1 to 100% by volume of the cavity of these microparticles being filled with water. In this way, remarkable concrete resistance to the freezing and thawing cycle is achieved, these microparticles providing improved protection for the concrete from the effects of the freezing and thawing cycle, even at a diameter of from 0.1 to 1 μm and in doses which are 1 to 2 orders of magnitude lower than those described in the prior art. Moreover, the compressive strength of the correspondingly hardened concrete is substantially improved, which was likewise not foreseeable.

12 Claims, No Drawings

USE OF POLYMERIC MICROPARTICLES IN BUILDING MATERIAL MIXTURES

This application is a continuation application of U.S. Ser. No. 11/247,962 filed Oct. 11, 2005 now abandoned which claims priority from German Patent Application No. 10 2005 046 681.8 filed Sep. 29, 2005, incorporated herein by reference in its entirety.

The present invention relates to the use of polymeric microparticles in hydraulically setting building material mixtures for improving the frost resistance thereof or the resistance thereof to the freezing and thawing cycle.

Regarding the resistance of concrete to frost and to the freezing and thawing cycle with simultaneous action of thawing agents, the imperviousness of its texture, a certain strength of the matrix and the presence of a certain pore structure are decisive. Capillary pores (radius: 2 µm-2 mm) or gel pores (radius: 2-50 nm) pass through the texture of a cement-bound concrete. Pore water contained therein differs in its state depending on the pore diameter. While water in the capillary pores retains its usual properties, that in the gel pores is classified as condensed water (mesopores: 50 nm) and adsorptively bound surface water (micropores: 2 nm), the freezing point of which may be, for example, well below −50° C. [M. J. Setzer, Interaction of water with hardened cement paste, "*Ceramic Transactions*" 16 (1991) 415-39]. As a result of this, a part of the pore water remains unfrozen even when the concrete is cooled to low temperatures (metastable water). At the same temperature, however, the vapor pressure above ice is lower than that above water. Since ice and metastable water are present simultaneously alongside one another, there is a vapor pressure gradient which leads to diffusion of the still liquid water to the ice and to the formation of ice from said water, with the result that dewatering of the smaller pores or ice collection in the larger pores takes place. This redistribution of water due to cooling takes place in every porous system and is decisively determined by the type of pore distribution.

The artificial introduction of microfine air pores in the concrete thus primarily produces so-called expansion spaces for expanding ice and ice water. Freezing pore water can expand in these pores or internal pressure and stresses of ice and ice water can be absorbed without microcrack formation and hence frost damage to the concrete occurring. The fundamental mode of action of such air pore systems has been described in relation to the mechanism of frost damage of concrete in a multiplicity of overviews [E. Schulson, Ice damage to concrete (1998), >http://www.crrel.usace.army.mil/techpub/CRREL_Reports/reports/SR98_06.pdf<; S. Chatterji, Freezing of air-entrained cement-based materials and specific actions of air-entraining agents, "*Cement & Concrete Composites*" 25 (2003) 759-65; G. W. Scherer, J. Chen & J. Valenza, Methods for protecting concrete from freeze damage, U.S. Pat. No. 6,485,560 B1 (2002); M. Pigeon, B. Zuber & J. Marchand, Freeze/thaw resistance, "*Advanced Concrete Technology*" 2 (2003) 11/1-11/17; B. Erlin & B. Mather, A new process by which cyclic freezing can damage concrete—the Erlin/Mather effect, "*Cement & Concrete Research*" 35 (2005) 1407-11].

A precondition for improved resistance of concrete to the freezing and thawing cycle is that the distance of each point in the hardened cement base from the next artificial air pore does not exceed a certain value. This distance is also referred to as the "Powers spacing factor" [T. C. Powers, The air requirement of frost-resistant concrete, "*Proceedings of the Highway Research Board*" 29 (1949) 184-202]. Laboratory tests have shown that exceeding the critical "Powers spacing factor" of 500 µm leads to damage to the concrete in the freezing and thawing cycle. In order to achieve this with a limited air pores content, the diameter of the artificially introduced air pores must therefore be less than 200-300 µm [K. Snyder, K. Natesaiyer & K. Hover, The stereological and statistical properties of entrained air voids in concrete: A mathematical basis for air void systems characterization, "*Material Science of Concrete*" VI (2001) 129-214].

The formation of an artificial air pore system depends decisively on the composition and the particle shape of the additives, the type and amount of the cement, the concrete consistency, the mixer used, the mixing time, the temperature, but also the type and amount of the air-entraining agent. Taking into account appropriate production rules, it is possible to control the influences thereof, but a multiplicity of undesired adverse effects may occur, which in the end means that the desired air content in the concrete may be exceeded or not reached and hence adversely affects the strength or the frost resistance of the concrete.

Such artificial air pores cannot be directly metered, but the air introduced by mixing is stabilized by the addition of so-called air-entraining agents [L. Du & K. J. Folliard, Mechanism of air entrainment in concrete "*Cement and Concrete Research*" 35 (2005) 1463-71]. Conventional air-entraining agents generally have a surfactant-like structure and break up the air introduced by the mixing into small air bubbles having a diameter of as far as possible less than 300 µm and stabilize these in the moist concrete texture. A distinction is made between two types. One type—e.g. sodium oleate, the sodium salt of abietic acid or vinsol resin, an extract from pine roots—reacts with the calcium hydroxide of the pore solution in the cement paste and is precipitated as insoluble calcium salt. These hydrophobic salts reduce the surface tension of the water and collect at the interface between cement particles, air and water. They stabilize the microbubbles and are therefore present on the surfaces of these air pores in the hardened concrete.

On the other hand, the other type—e.g. sodium laurylsulfate (SDS) or sodium dodecylphenylsulfonate—forms soluble calcium salts with calcium hydroxide, which calcium salts, however, exhibit abnormal solution behavior. Below a certain critical temperature, these surfactants have a very low solubility; above this temperature, they are very readily soluble. By preferentially collecting at the air/water boundary, they also reduce the surface tension and thus stabilize the microbubbles and are preferably present at the surfaces of these air pores in the hardened concrete.

With the use of these air-entraining agents according to the prior art, a multiplicity of problems occur [L. Du & K. J. Folliard, Mechanism of air entrainment in concrete "*Cement & Concrete Research*" 35 (2005) 1463-71]. For example, longer mixing times, different mixer speeds and changed metering sequences in the case of the ready-mix concretes result in the stabilized air (in the air pores) being expelled again. The transport of concrete with longer transport times, poor thermostating and different pump and conveyor apparatuses, and the introduction of these concretes in association with changed subsequent processing, jerking and temperature conditions, can significantly change a previously established air pore content. In the worst case, this may mean that a concrete no longer fulfills the required limits of a certain exposure class and has therefore become unusable [EN 206-1 (2000), Concrete-Part I: Specification, performance, production and conformity]. The content of fine substances in the concrete (e.g. cement having a different alkali metal content, additives, such as fly ash, silica dust or color additives) likewise adversely affects the air entrainment. There may also be interactions with antifoam flow improvers, which therefore expel air pores but may also introduce them in an uncontrolled manner.

All these influences which complicate the production of frost-resistant concrete can be avoided if, instead of producing the required air pore system by abovementioned air-entraining agents having a surfactant-like structure, the air content originates from the admixing or solid metering of polymeric microparticles (hollow microspheres) [H. Sommer, A new method of making concrete resistant to frost and de-icing salts, "*Betonwerk & Fertigteiltechnik*" 9 (1978) 476-84]. Since the microparticles generally have particle sizes of less than 100 µm, they can also be more finely and uniformly distributed in the concrete texture than artificially introduced air pores. Consequently, even small amounts are sufficient for sufficient resistance of the concrete to the freezing and thawing cycles.

The use of such polymeric microparticles for improving the resistance of concrete to the freezing and thawing cycle is already known from the prior art [cf. DE 2229094 A1, U.S. Pat. Nos. 4,057,526 B1, 4,082,562 B1, DE 3026719 A1]. The microparticles described therein are distinguished in particular by the fact that they have a cavity which is smaller than 200 µm (diameter), and this hollow core consists of air (or a gaseous substance). This also includes porous microparticles of the 100 µm scale, which may have a multiplicity of relatively small cavities and/or pores.

With the use of hollow microparticles for artificial air entrainment in concrete, two factors proved to be disadvantageous for establishing this technology on the market. Firstly, the production costs of hollow microspheres according to the prior art are too high and secondly, satisfactory resistance of the concrete to the freezing and thawing cycles can be achieved only with relatively large doses.

It was therefore the object of the present invention to provide an agent for improving the frost resistance of hydraulically setting building material mixtures or the resistance of said mixtures to the freezing and thawing cycle, which displays its full efficiency even in relatively small doses. This object was achieved, according to the invention, by using microparticles whose cavity is filled with from 1 to 100% by volume of water.

Surprisingly, a remarkable concrete resistance to the freezing and thawing cycle was achieved when corresponding polymeric microparticles whose cavity is filled not (only) with air but with water are used for air entrainment. Also surprising is that these microparticles provide improved protection of the concrete from the effects of the freezing and thawing cycle even in the case of a diameter of 0.1-1 µm and in doses which are 1-2 orders of magnitude smaller than in the prior art.

This was so surprising since it had been assumed to date that only artificially introduced air pores in the form of air microbubbles or air-filled microparticles are capable of providing sufficient free space for expanding, freezing water. According to the present invention, polymeric microparticles whose cavity is filled with from 1 to 100% by volume, in particular from 10 to 100% by volume, of water are used.

According to the prior art, such water-filled microparticles are already known and are described in the publications EP 22 633 B1, EP 73 529 B1 and EP 188 325 B1. Moreover, these water-filled microparticles are sold commercially under the brand names ROPAQUE® by Rohm & Haas. These products have to date mainly been used in inks and paints for improving the hiding power and opacity of coatings or prints on paper, board and other materials.

According to a preferred embodiment, the microparticles used consist of polymer particles which contain a polymer core (A) based on an unsaturated carboxylic acid (derivative) monomer and a polymer shell (B) based on a nonionic, ethylenically unsaturated monomer, the core/shell polymer particles having been swollen with the aid of a base.

The unsaturated carboxylic acid (derivative) monomers preferably consist of a compound selected from the group consisting of acrylic acid, methacrylic acid, maleic acid, maleic anhydride, fumaric acid, itaconic acid and crotonic acid.

In particular, styrene, butadiene, vinyltoluene, ethylene, vinyl acetate, vinyl chloride, vinylidene chloride, acrylonitrile, acrylamide, methacrylamide, $C_1$-$C_{12}$-alkyl esters of acrylic or methacrylic acid are used as nonionic, ethylenically unsaturated monomers which form the polymer shell (B).

The preparation of these polymeric microparticles by emulsion polymerization and their swelling with the aid of bases, such as, for example, alkali metal hydroxides or alkali metal hydroxides and ammonia or an amine are likewise described in European Patents EP 22 633 B1, EP 735 29 B1 and EP 188 325 B1.

The microparticles used according to the invention have a preferred diameter of from 0.1 to 20 µm. The polymer content of the microparticles used may be from 2 to 98% by weight, depending on the diameter and the water content.

The commercially available microparticles (for example of the type ROPAQUE®) are present as a rule in the form of an aqueous dispersion which must contain a certain proportion of dispersant having a surfactant structure in order to suppress agglomeration of the microparticles. However, it is also possible alternatively to use dispersions of these microparticles which comprise no surface-active surfactants (which may have a disturbing effect in the concrete). For this purpose, the microparticles are dispersed in aqueous solutions which comprise a rheological standardizing agent. Such thickening agents, which have a pseudoplastic viscosity, are generally of a polysaccharide nature [D. B. Braun & M. R. Rosen, "*Rheology Modifiers Handbook*" (2000), William Andrew Publ.]. Microbial exopolysaccharides of the gellan group (S-60) and in particular welan (S-130) and diutan (S-657) are outstandingly suitable [E. J. Lee & R. Chandrasekaran, X-ray and computer modeling studies on gellan-related polymers: Molecular structures of welan, S-657, and rhamsan, "*Carbohydrate Research*" 214 (1991) 11-24].

In the case of the microparticles used according to the invention, the surfactants dissolved in the aqueous dispersion can be separated off by first coagulating the microparticles, for example with calcium chloride ($CaCl_2$) and then washing them with water. Finally, redispersion in any desired thickening dispersant is possible.

According to the invention, the water-filled, polymeric microparticles are used in the form of an aqueous dispersion (with or without surfactants).

It is entirely possible within the scope of the present invention to add the water-filled microparticles directly as a solid to the building material mixture. For this purpose, the microparticles—as descried above—are coagulated and are isolated from the aqueous dispersion by customary methods (e.g. filtration, centrifuging, sedimentation and decanting) and the particles are then dried, with the result that the water-containing core can certainly be retained. In order to leave the water content in the microparticles as far as possible unchanged, washing of the coagulated material with readily volatile liquids may be helpful. In the case of the ROPAQUE® types which are used and have a (poly)styrene shell, for example, alcohols, such as MeOH or EtOH, have proven useful.

The water-filled microparticles are added to the building material mixture in a preferred amount of from 0.01 to 5% by volume, in particular from 0.1 to 0.5% by volume. Here, the building material mixture, for example in the form of concrete or mortar, may contain the customary hydraulically setting binders, such as, for example, cement, lime, gypsum or anhydrite.

A substantial advantage of the use of the water-filled microparticles is that only an extremely small amount of air is introduced into the concrete. Substantially improved compressive strengths of the concrete can be achieved as a result. These are about 25-50% above the compressive strengths of concrete which was obtained with conventional air entrainment. Thus, it is possible to achieve strength classes which can otherwise be established only by means of a substantially lower water/cement value (W/C value). However, low W/C values in turn may substantially limit the processibility of the concrete. Moreover, the result of higher compressive strengths may be that the cement content in the concrete which is required for strength development can be reduced and hence the price per m³ of concrete is significantly reduced.

The advantages of the present invention can be summarized in the form that

- the use of water-filled microparticles leads to an artificial air pore system in the hardened concrete,
- the air content of the concrete is substantially reduced compared with conventional air-entraining agents,
- even extremely small amounts of these water-filled microparticles are sufficient for producing high resistance of the concrete in the freezing and thawing cycle,
- the compressive strength of these concretes is substantially improved,
- the production of this air pore system with the aid of these water-filled microparticles substantially improves the robustness with respect to other additives, aggregates, flow improvers, changed cement compositions, different W/C values and further parameters relevant in concrete technology,
- the use of water-filled microparticles substantially improves the application requirements for concrete with high resistance to the freezing and thawing cycle with regard to the production, transport and processibility thereof.

The following examples illustrate the advantages of the use of water-filled microparticles in order to obtain high resistance of the concrete in the freezing and thawing cycle and low concrete weathering caused by frost.

EXAMPLES

Example 1

Water-filled microparticles of the type ROPAQUE® (from Rohm & Haas) having different particle sizes were tested.

A different water content in the core of the individual ROPAQUE® type was produced by differentiated drying. It is dependent on the drying temperature, the drying time and the low pressure (vacuum) used.

The water content in the interior of the microparticles can be determined by Karl Fischer titration if the externally dried (poly)styrene shell was previously dissolved in a suitable solvent (e.g. anhydrous acetone). If a coagulated ROPAQUE® dispersion is washed first with water and then with methanol, the enclosed proportion of water (100% by volume) of the ROPAQUE® microparticles can be virtually completely determined with the aid of the Karl Fischer titration by simple and rapid air drying at room temperature and atmospheric pressure. It should be noted that the water content determined does not agree exactly with the actual water content in the microparticles, since there is always a time gap between determination of the water content and use of the concrete, during which water (or water vapor) can diffuse out of the cavity through the shell of the microparticles. Even in the case of testing close to the time of use, the stated water content can therefore only be a guide value.

The most important data according to the manufacturer and theoretical calculations of the water content in % by volume of these microparticles are summarized in table 1. The polymer content of the microparticles [in % by weight] is calculated as follows:

Polymer content [in % by weight]=100%−m$_{(H2O)}$ [in % by weight].

TABLE 1

| Ropaque | Ultra-E | OP-96 | AF-1055 |
|---|---|---|---|
| Size [a] | 0.38 μm | 0.55 μm | 1.0 μm |
| Void fraction [a] | 44% | 43% | 55% |
| Dry density [a] | 0.591 g/cm³ | | 0.5 g/cm³ |
| Shell thickness [b] | 45 nm | 68 nm | 90 nm |
| Water content | Water content [c] [in % by wt.] | | |
| 100% by volume | 43% | 42% | 54% |
| 90% by volume | 40.5% | 39% | 51.5% |
| 80% by volume | 37.5% | 36.5% | 48.5% |
| 70% by volume | 34.5% | 33.5% | 45% |
| 60% by volume | 31% | 30% | 41% |
| 50% by volume | 27.5% | 26.5% | 37% |
| 40% by volume | 23% | 22.5% | 32% |
| 30% by volume | 18.5% | 18% | 26% |
| 20% by volume | 13% | 12.5% | 19% |
| 15% by volume | 10% | 10% | 15% |
| 10% by volume | 7% | 7% | 10.5% |

[a] The data have been taken from the technical data sheet of ROPAQUE ® (from Rohm & Haas)
[b] The shell thickness d is calculated from the stated data, assuming an ideal spherical shape for the microparticles: d = [1 − (void fraction/100%)$^{1/3}$] · size/2
[c] The water content of the microparticles [in % by weight] is calculated as follows: Water content [in % by weight] = % by volume · m$_{(H2O)}$/[% by volume/100% · m$_{(H2O)}$ + m$_{(PS)}$] where m$_{(H2O)}$ = $\rho_{(H2O)}$ · π/6 · (size − 2d)³, where m$_{(PS)}$ = $\rho_{(PS)}$ · V$_{PS}$ and V$_{PS}$ = π/6 · size³ [1 − (void fraction/100%)], and where a density for the (poly)styrene shell of $\rho_{(PS)}$ = 1.05 g/cm³.

The concrete used in the examples contained 355 kg/m³ of the US cement "Lonestar Type I/II". All further aggregates (e.g. gravel, sand, etc.) were in the composition customary for concrete. A water/cement ratio of W/C=0.55 was established.

Example 2

For determining the resistance of the concrete in the freezing and thawing cycle, a commercial dispersion sample comprising microparticles of the type ROPAQUE®, corresponding to ASTM C 666 (procedure A), was added to the concrete and the latter was exposed to 180 freezing-and-thawing cycles in a freezing-thawing chamber. In addition, the plastic air content of the concrete was determined and the compressive strength of the concretes were determined after 7 and 28 days. The values determined for the resistance to the freezing and thawing cycle of the concrete should not differ by more than 10% from the reference (classical air-entraining agent). In other words, all values determined >90 (reference: 99) means sufficient protection of the concrete from frost damage. The weathering factor provides a qualitative measure of the optically visible frost damage of the outer layers of the concrete, and is rated as follows: 0=good, 5=poor. It should therefore not be poorer than "3".

The following variations were implemented:
a) Microparticles of the type ROPAQUE® having different particle sizes were used:
   Ultra-E (0.38 μm) and
   OP-96 (0.55 μm).
   The microparticles were present as an about 30% strength dispersion.
   The water content of the microparticles is 100% by volume.
b) Different amounts of microparticles were metered in: 0.01, 0.05, 0.1 and 0.5% by volume of ROPAQUE®, based on the concrete.

For comparison, a conventional air-entraining agent was used, and the results are summarized in table 2.

Example 3

A commercial dispersion of the type ROPAQUE® was coagulated beforehand with calcium dichloride ($CaCl_2$/EtOH/dispersion=1/1/1), and the surfactants (emulsifiers) dissolved in the dispersion were washed out. The "surfactant-free" microparticles were then dried in vacuo at 40° C.

In the determination of the resistance of the concrete to the freezing and thawing cycle, these microparticles were added as a solid to the mixer and exposed again to 180 freezing-and-thawing cycles according to ASTM 666 C (procedure A). The following variations were implemented:
a) Microparticles having different particle sizes, Ropaque Ultra-E (0.38 μm) and AF-1055 (1.0 μm), were purified to remove surfactants and were dried:
   SF-01 (0.38 μm) having a water content of 30% by volume of $H_2O$,
   SF-11 (0.38 μm) comprising 45% by volume of $H_2O$,
   SF-02 (1.0 μm) comprising 40% by volume of $H_2O$ and
   SF-12 (1.0 μm) comprising 60% by volume of $H_2O$.
b) Different amounts of these microparticles were metered in:
   1st batch: 0.025, 0.05 and 0.25% by volume;
   2nd batch: 0.1, 0.25 and 0.5% by volume, based on the concrete.

For comparison, a conventional air-entraining agent was once again used. The results are summarized in table 3.

Example 4

The microparticles, "surfactant-free" according to example 2, of a commercial ROPAQUE® type were dispersed in a rheological standardizing agent (0.4% strength by weight diutan solution) in order to suppress the agglomeration of the dried microparticles in the water or cement paste.

In the determination of the resistance of the concrete to the freezing and thawing cycle, these microparticles, in the form of a 20% strength by weight dispersion in a 0.4% strength by weight diutan solution, were added to the mixer and subjected again to 180 freezing-and-thawing cycles according to ASTM 666 C (procedure A). The following variations were implemented:
a) The "surfactant-free" microparticles having different particle sizes [SF-11 (0.38 μm) and SF-12 (1.0 μm)] were redispersed in a 0.4% strength by weight diutan solution:
   SF-D1 (0.38 μm) comprising 45% by volume of $H_2O$ and
   SF-D2 (1.0 μm) comprising 60% by volume of $H_2O$.
b) Different amounts of these microparticle dispersions were metered in: 0.1, 0.25 and 0.5% by volume, based on the concrete.

For comparison, a conventional air-entraining agent AE-90 was once again used. The results are summarized in table 4 below.

TABLE 2

| Example (sample) | Properties/parameters | Results (n.p. = not passed) | | | | Ref.[a] |
|---|---|---|---|---|---|---|
| Ropaque (Ultra-E) 0.38 μm, water content: 100% by volume | Dose [% by vol.] | 0.01 | 0.05 | 0.1 | 0.5 | — |
| | Slump [cm] | 17.8 | 19.7 | 18.4 | 21.0 | 19.7 |
| | Air pore content [% by vol.] | 1.9 | 2.3 | 3.1 | 5.5 | 7.6 |
| | Compressive strength [N/mm²] 7 days | 27.2 | 26.0 | 24.8 | 19.9 | 18.0 |
| | 28 days | 35.8 | 33.9 | 32.5 | 25.2 | 24.1 |
| | FT resistance factor[b] | n.p. | 64 | 99 | 99 | 99 |
| | Weathering factor[c] | — | 3 | 3 | 2 | 2 |
| Ropaque (OP-96) 0.55 μm, water content: 100% by volume | Dose [% by vol.] | 0.01 | 0.05 | 0.1 | 0.5 | — |
| | Slump [cm] | 18.4 | 17.8 | 19.0 | 22.2 | 19.7 |
| | Air pore content [% by vol.] | 2.0 | 3.0 | 4.0 | 7.7 | 7.6 |
| | Compressive strength [N/mm²] 7 days | 27.8 | 24.6 | 23.1 | 15.2 | 18.0 |
| | 28 days | 34.3 | 32.5 | 30.6 | 21.7 | 24.1 |
| | FT resistance factor[b] | n.p. | 97 | 93 | 99 | 99 |
| | Weathering factor[c] | — | 3 | 4 | 2 | 2 |

[a] The reference (ref.) is a concrete comprising air-entraining agent AE-90.

[b] The freezing/thawing cycle resistance factor is based on ASTM 666 C (procedure A). (The values determined for the resistance of the concrete to the freezing and thawing cycle should not deviate by more than 10% from the reference (classical air-entraining agent). In other words, all determined values >90 mean sufficient protection of the concrete from frost damage.)

[c] The weathering factor is a qualitative measure of the optically visible frost damage and is subject to a visual rating on the scale 0 (good) to 5 (poor). (A concrete having good resistance to the freezing and thawing cycle should be given at least the rating 3.)

TABLE 3

| Example (sample) | Properties/parameters | Results (n.p. = not passed) | | | Ref.[a] |
|---|---|---|---|---|---|
| Ropaque (SF-01) 0.38 μm, water content: 30% by volume | Dose [% by vol.] | 0.05 | 0.25 | 0.5 | — |
| | Slump [cm] | 15.2 | 16.5 | | 17.1 |
| | Air pore content [% by vol.] | 2.1 | 4.0 | | 5.7 |
| | Compressive strength [N/mm²] 7 days | 27.9 | 25.0 | | 18.9 |
| | 28 days | 36.5 | 31.4 | | 27.5 |
| | FT resistance factor[b] | n.p. | 97 | | 97 |
| | Weathering factor[c] | — | 3 | | 3 |
| Ropaque (SF-11) 0.38 μm, water content: 45% by volume | Dose [% by vol.] | 0.1 | 0.25 | 0.5 | — |
| | Slump [cm] | 12.7 | 16.5 | | 12.7 |
| | Air pore content [% by vol.] | 2.2 | 2.9 | | 6.8 |
| | Compressive strength [N/mm²] 7 days | 28.8 | 27.5 | | 20.4 |
| | 28 days | 38.1 | 34.3 | | 28.0 |
| | FT resistance factor[b] | n.p. | 98 | | 98 |
| | Weathering factor[c] | — | 2 | | 2 |
| Ropaque (SF-02) 1.0 μm, water content: 40% by volume | Dose [% by vol.] | 0.05 | 0.25 | 0.5 | — |
| | Slump [cm] | 14.0 | 12.7 | | 17.1 |
| | Air pore content [% by vol.] | 1.8 | 2.3 | | 5.7 |
| | Compressive strength [N/mm²] 7 days | 28.4 | 27.9 | | 18.9 |
| | 28 days | 37.1 | 37.1 | | 27.5 |
| | FT resistance factor[b] | n.p. | 92 | | 97 |
| | Weathering factor[c] | — | 3 | | 3 |
| Ropaque (SF-12) 1.0 μm, water | Dose [% by vol.] | 0.1 | 0.25 | 0.5 | — |
| | Slump [cm] | 12.7 | 12.7 | 12.7 | 12.7 |
| | Air pore content [% by vol.] | 1.9 | 2.6 | 2.4 | 6.8 |

TABLE 3-continued

| Example (sample) | Properties/parameters | | Results (n.p. = not passed) | | | Ref.[a] |
|---|---|---|---|---|---|---|
| content: 60% by volume | Compressive strength [N/mm$^2$] | 7 days 28 days | 29.2 36.5 | 27.7 36.7 | 27.6 38.5 | 20.4 28.0 |
| | FT resistance factor[b] | | n.p. | 93 | 91 | 98 |
| | Weathering factor[c] | | — | 3 | 2 | 2 |

[a] The reference (ref.) is a concrete comprising air-entraining agent AE-90.
[b] The freezing/thawing cycle resistance factor is based on ASTM 666 C (procedure A). (The values determined for the resistance of the concrete to the freezing and thawing cycle should not deviate by more than 10% from the reference (classical air-entraining agent). In other words, all determined values >90 mean sufficient protection of the concrete from frost damage.)
[c] The weathering factor is a qualitative measure of the optically visible frost damage and is subject to a visual rating on the scale 0 (good) to 5 (poor). (A concrete having good resistance to the freezing and thawing cycle should be given at least the rating 3.)

TABLE 4

| Example (sample) | Properties/parameters | | Results (n.p. = not passed) | | | Ref.[a] |
|---|---|---|---|---|---|---|
| Ropaque (SF-D1) 0.38 μm, water content: 45% by volume | Dose [% by vol.] | | 0.1 | 0.25 | 0.5 | — |
| | Slump [cm] | | 15.0 | 17.3 | 18.5 | 12.7 |
| | Air pore content [% by vol.] | | 2.0 | 2.5 | 2.8 | 6.8 |
| | Compressive strength [N/mm$^2$] | 7 days 28 days | | 25.9 33.9 | 23.0 33.0 | 20.4 28.0 |
| | FT resistance factor(b) | | n.p. | 37 | 99 | 98 |
| | Weathering factor[c] | | — | 3 | 3 | 2 |
| Ropaque (SF-D2) 1.0 μm, water content: 60% by volume | Dose [% by vol.] | | 0.1 | 0.25 | 0.5 | — |
| | Slump [cm] | | | 14.7 | 17.3 | 12.7 |
| | Air pore content [% by vol.] | | | 2.1 | 3.0 | 6.8 |
| | Compressive strength [N/mm$^2$] | 7 days 28 days | | 26.1 34.3 | 24.6 30.5 | 20.4 28.0 |
| | FT resistance factor(b) | | | n.p. | 90 | 98 |
| | Weathering factor[c] | | — | — | 3 | 2 |

[a] The reference (ref.) is a concrete comprising air-entraining agent AE-90.
[b] The freezing/thawing cycle resistance factor is based on ASTM 666 C (procedure A). (The values determined for the resistance of the concrete to the freezing and thawing cycle should not deviate by more than 10% from the reference (classical air-entraining agent). In other words, all determined values >90 mean sufficient protection of the concrete from frost damage.)
[c] The weathering factor is a qualitative measure of the optically visible frost damage and is subject to a visual rating on the scale 0 (good) to 5 (poor). (A concrete having good resistance to the freezing and thawing cycle should be given at least the rating 3.)

The invention claimed is:

1. A method comprising adding polymeric microparticles having a cavity therein to a hydraulically setting building mixture, wherein the microparticles consist of polymer particles which contain a polymer core (A) swelled with the aid of an aqueous base and based on an unsaturated carboxylic acid (derivative) monomer, and a polymer shell (B) based on a nonionic ethylenically unsaturated monomer, wherein from 10 to 100% by volume of the cavity of the microparticles are filled with water.

2. The method as claimed in claim 1, wherein the unsaturated carboxylic acid (derivative) monomers are selected from the group consisting of acrylic acid, methacrylic acid, aleic acid, maleic anhydride, fumaric acid, itaconic acid and crotonic acid.

3. The method as claimed in claim 1, wherein the nonionic, ethylenically unsaturated monomers are selected from the group consisting of styrene, butadiene, vinyltoluene, ethylene, vinyl acetate, vinyl chloride, vinylidene chloride, acrylonitrile, acrylamide, methacrylamide, $C_1$-$C_{12}$-alkyl esters of acrylic or methacrylic acid.

4. The method as claimed in claim 1, wherein the microparticles have a polymer content of from 2 to 98% by weight.

5. The method as claimed in claim 1, wherein the microparticles have a diameter of from 0.1 to 20 μm.

6. The method as claimed in claim 1, wherein the microparticles contain no surfactants.

7. The method as claimed in claim 1, wherein the microparticles are used in an amount of from 0.01 to 5% by volume, based on the building material mixture.

8. The method as claimed in claim 1, wherein the building material mixtures comprise a binder selected from the group consisting of cement, lime, gypsum and anhydrite.

9. The method as claimed in claim 1, wherein the building material mixtures are concrete or mortar.

10. The method of claim 5, wherein the microparticles have a diameter of from 0.2 to 20.0 μm.

11. The method of claim 7, wherein the microparticles are present in an amount of from 0.1 to 0.5% by volume.

12. The method of claim 1, wherein the microparticles have a diameter of from 0.2 to 20.0 μm.

* * * * *